May 2, 1967  E. B. CONNERAT ET AL  3,317,236
FASTENING MEANS FOR SHIPPING CONTAINERS
Filed April 1, 1965  3 Sheets-Sheet 1
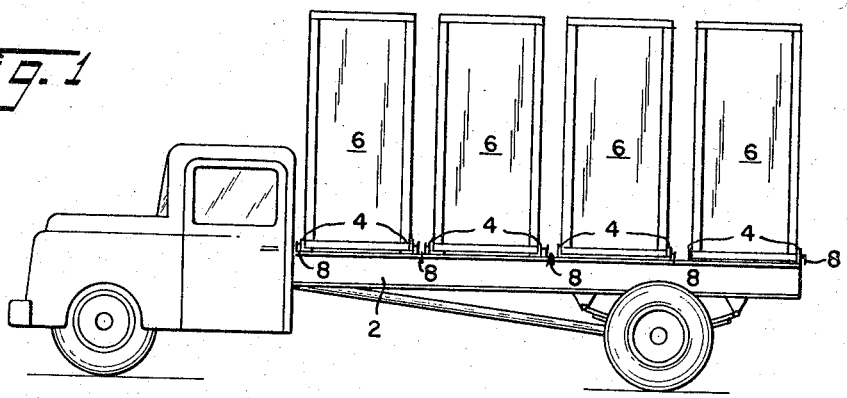
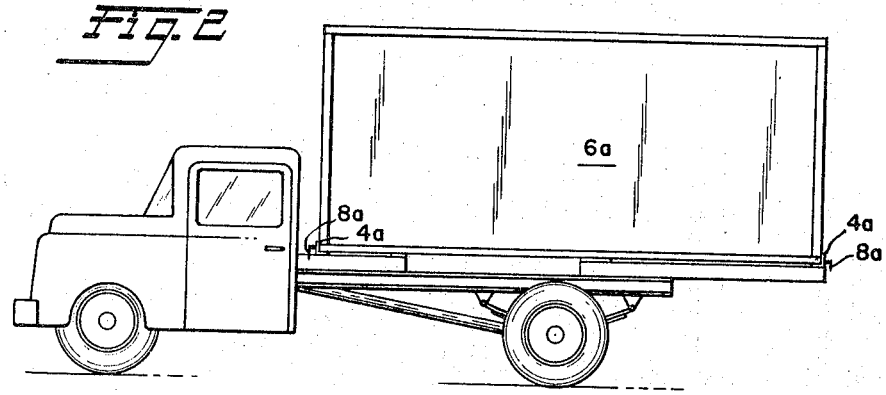
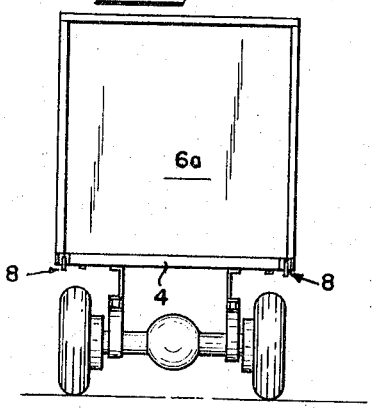
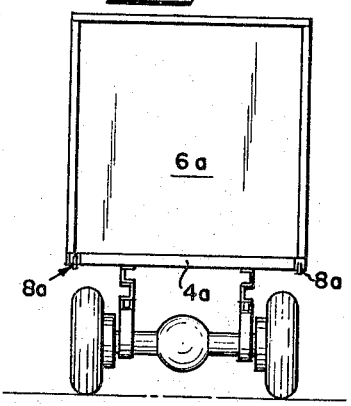
INVENTORS
EDWIN B. CONNERAT
DENVER EYLER
BY
*Scrivener Parker Scrivener + Clarke*
ATTORNEYS

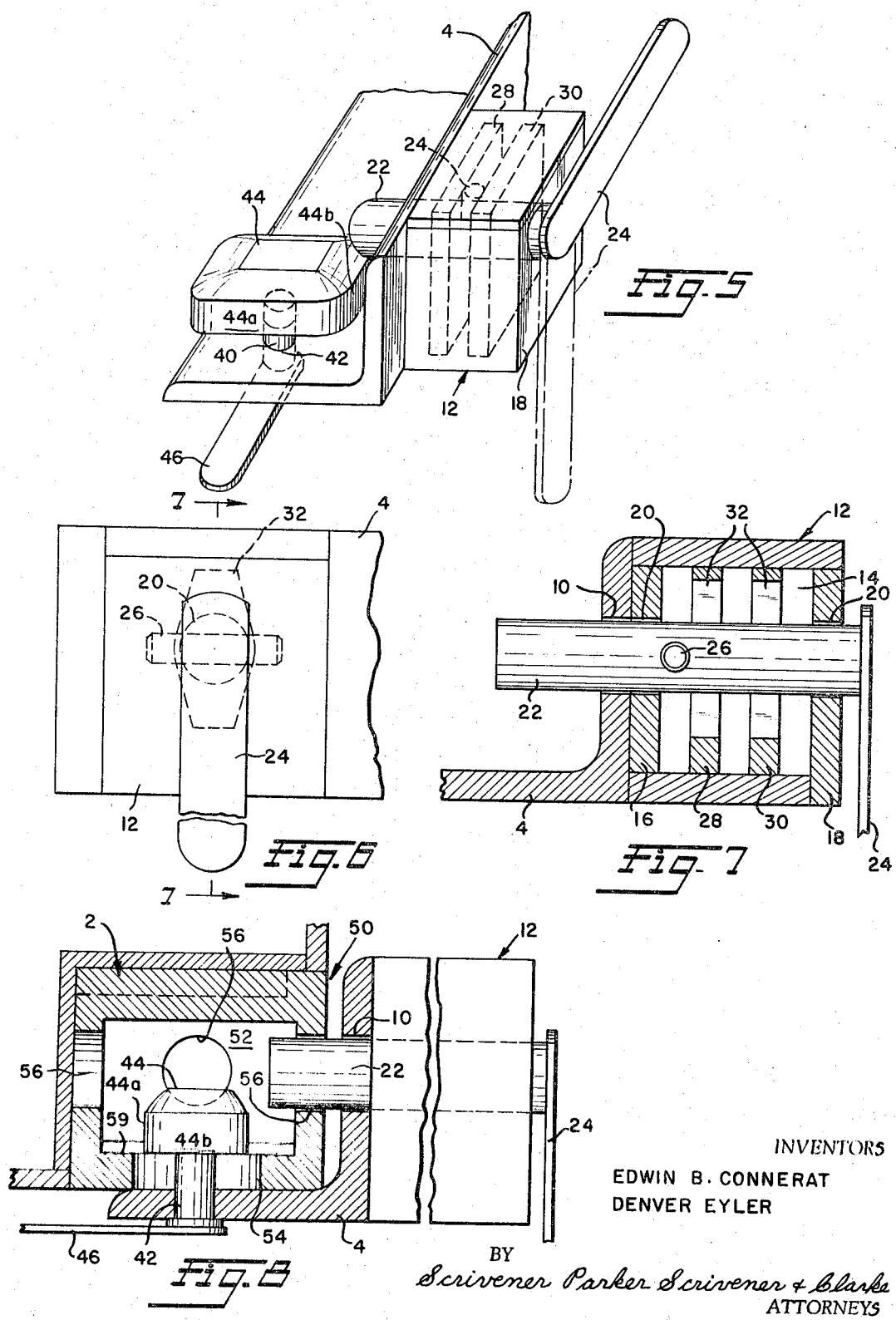

May 2, 1967  E. B. CONNERAT ET AL  3,317,236
FASTENING MEANS FOR SHIPPING CONTAINERS
Filed April 1, 1965  3 Sheets-Sheet 3

INVENTORS
EDWIN B. CONNERAT
DENVER EYLER

BY
Scrivener Parker Scrivener & Clarke
ATTORNEYS

United States Patent Office 3,317,236
Patented May 2, 1967

3,317,236
FASTENING MEANS FOR SHIPPING CONTAINERS
Edwin B. Connerat, 6122 Woodmont Road, Alexandria, Va. 22307, and Denver Eyler, Atlanta, Ga. (1814 Coronado Terrace, Fairfax, Va. 22030)
Filed Apr. 1, 1965, Ser. No. 444,729
2 Claims. (Cl. 296—35)

This invention relates generally to improved means for fastening large shipping containers to the chassis of transport vehicles, and more particularly to locking means including a non-removable bolt that is axially shiftable between locking and retracted positions, and means preventing inadvertent shifting of the bolt between these positions.

Many devices have been proposed in the prior art for fastening shipping containers to the chassis of trucks, railroad flatcars, airborne vehicles, and the like. In these prior fastening devices, use is made of movable locking elements (for example, sliding bolts, pivoted arms, cam means, and so forth) for rigidly connecting the containers with the chassis. In many of the prior locking devices using sliding bolts, the bolts are completely removable from their associated housings, and to prevent loss, the bolts are normally chained to the equipment. This presents the drawback that in the event that the bolts should hang freely from the chains during transport without load, the bolts bang against and are damaged by the chassis, and often the chain are broken whereupon the bolts are lost completely. Moreover, many of the known locking devices are subject to inadvertent movement from locked to unlocked positions as a consequence of the vibration imparted thereto by the vehicles during transport. Furthermore the known devices are of complex expensive construction and are not rugged enough to rigidly maintain large massive containers in locked relation on their associated transport chassis.

Accordingly, the primary object of the present invention is to provide improved locking means for fastening a container to a chassis by means of locking components that are permanently fastened to the chassis. In the preferred embodiment of the invention, use is made of a plurality of locking means in the chassis, each of said locking means including sliding bolt and rotary key means arranged for cooperation with a pair of orthoganally-arranged surfaces on container-carried fastening elements.

A more specific object of the invention is to provide improved locking means including a bolt that is permanently mounted in a housing for axial displacement between locking and retracted positions. In accordance with an important feature of the invention, safety means are provided for preventing inadvertent uncontrolled displacement of the bolt between the locking and retracted positions. More particularly, cooperating means are provided on the bolt and on the housing associated therewith that require angular rotation of the bolt from a normal initial position to an angularly displaced second position to permit axial shifting of the bolt from the locking to the retracted position. According to another safety feature of the invention, means are provided for establishing an intermediate locking position of the bolt between its fully extended locking position and its fully retracted position.

A further object of the invention is to provide a locking system including fastening elements secured to the bottom corner portions of rectangular containers, and locking means for fastening the container-carried elements to the chassis, said locking means including a pair of longitudinally-spaced, opposed L-shaped angle irons secured to the upper surface of the chassis adjacent the front and rear lower edges of the container, and means carried by each end of each angle iron for locking engagement with orthogonally-arranged surfaces on the fastening elements. Each of the locking means at one end of an angle iron comprises horizontal key means mounted on the horizontal portion of the angle iron for rotation about a vertical axis, and axially sliding longitudinally-arranged bolt means carried by the vertical portion of the angle iron. The key is adapted for insertion in a corresponding key slot contained in the bottom wall of a hollow fastening element, and the bolt is adapted for endwise insertion into an aperture contained in a side wall of the fastening element.

Other objects and advantages of the invention will become apparent from a study of the following specification when considered in conjunction with the accompanying drawing, in which:

FIGURE 1 illustrates an application of the locking apparatus to a high bed truck having a chassis to which are fastened a plurality of containers;

FIGURE 2 illustrates the application of the locking apparatus to a low bed truck having a chassis to which is fastened a single large container;

FIGURES 3 and 4 are rear end views of the trucks of FIGURES 1 and 2, respectively;

FIGURE 5 is a perspective view of one end of the transverse angle iron illustrating one of the locking means carried thereby, the operating handles of the locking means being shown in solid lines in their unlocked positions;

FIGURE 6 is a detailed elevational view of the locking means, the bolt handle being illustrated in its normal locked position;

FIGURE 7 is a sectional view taken along line 7—7 in FIGURE 6;

FIGURE 8 is a sectional view illustrating the manner in which a container-carried fastening element is locked to the angle iron means, the handles of the locking means being shown in their locked positions;

Figure 9:
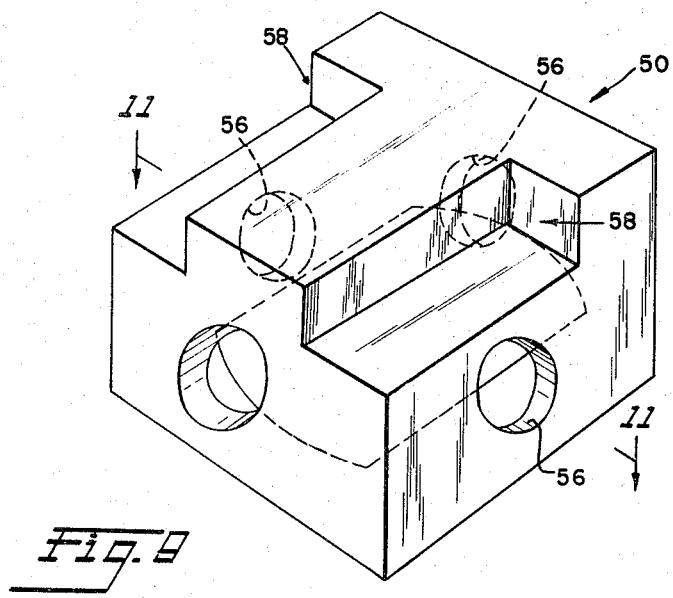
FIGURE 9 is a perspective view of one of the container fastening elements.
Figure 10:
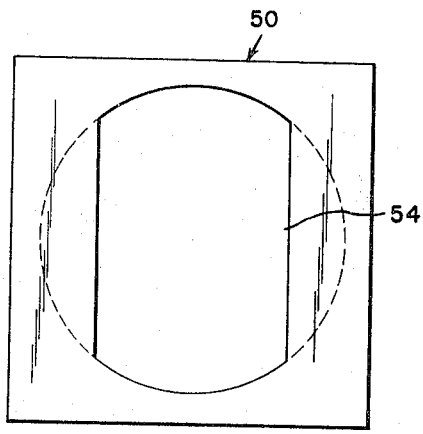
FIGURE 10 is a bottom view of the fastening element of FIGURE 9.
Figure 11:
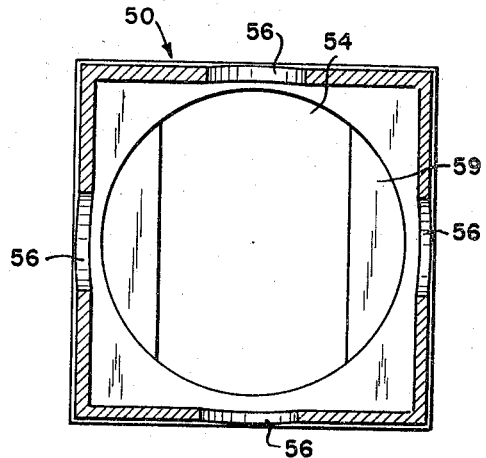
FIGURE 11 is a sectional view of the fastening element taken along line 11—11 of FIGURE 9.

Referring to FIGURES 1 and 3, the high bed truck includes a chassis 2 upon the upper surface of which are secured opposed pairs of longitudinally-spaced, transversely-extending L-shaped angle irons 4. Supported on the chassis between each pair of angle irons is a container 6. Beneath each corner of each container 6 is secured a fastening element (illustrated in FIGURE 9) that is locked to the adjacent angle iron by locking means 8 (illustrated in FIGURE 5).

Similarly, in the low bed truck embodiment of FIGURES 2 and 4, the single container 6a is mounted between a pair of opposed L-shaped angle irons 4a and is fastened thereto by means of container-carried fastening elements (FIGURE 9) and transversely-spaced pairs of locking means 8a.

Referring to FIGURES 5-8, the angle iron 4, which carries adjacent each end the locking means 8, includes a horizontal portion that is secured (by bolts or permanent welds, for example) to the upper surface of the chassis 2, and a rigid vertical portion extending upwardly therefrom. Secured to the external surface of the vertical portion opposite a horizontal through-passage 10 is a housing 12 having top, bottom and side walls defining a chamber 14. The opposed side walls 16, 18 adjacent and remote from the angle iron 4, respectively, contain openings 20 aligned with passage 10. Mounted for rotary and axial sliding movement intermediate its ends in openings 20 is a bolt 22 to the free end of which is secured an eccentric handle 24. Owing to the force of gravity acting on handle 24, bolt 22 normally has a given angular orientation relative to housing 12 as shown in FIGURES 6–8 (and as shown by the broken line in FIGURE 5).

Secured to bolt 22 within chamber 14 is a lateral pin or projection 26 that is horizontal when handle 24 is in the normal position illustrated in FIGURES 6–8. Secured in housing 12 in spaced parallel relation between side walls 16, 18 is a pair of transverse plates 28, 30 having aligned slots 32 that slidably receive the bolt 22. These slots are of a size, configuration, and orientation to permit axial sliding passage of the projection 26 only when handle 24 is pivoted from its normal position (FIGURES 6–8) to the angularly displaced position illustrated by the solid lines in FIGURE 5. Consequently, to shift the bolt 22 to the right from the locking position illustrated in FIGURE 7, the handle 24 must first be pivoted upwardly 90° to the FIGURE 5 position (or to a position displaced 180° therefrom) to align pin 26 with the slot 32 in plate 28. Upon shifting the bolt 22 to the right (by handle 24) to cause pin 26 to pass through the slot in plate 28, and upon releasing of the handle, the handle will be returned by gravity to its normal position and bolt 22 will be locked in an intermediate position in which pin 26 is horizontal and disposed between plates 28 and 30. To further shift the bolt 22 to the right to its fully retracted position, the handle 24 is again raised to its FIGURE 5 position, and the bolt is further shifted to the right to cause pin 26 to pass through plate 30 via the slot 32 therein. Upon release of handle 24, it is returned by gravity to its normal (FIGURES 6–8) position. It is apparent that as a result of the provision of the pin 26 between openings 10 and 20, the bolt is permanently connected with the housing 12.

The locking means 8 at each end of each angle iron 4 further includes key means comprising a vertical shaft 40 rotatably mounted in a passage 42 contained in the horizontal portion of angle iron 4 adjacent the passage 10. Horizontal key 44 and horizontal handle 46 are secured to the upper and lower ends of shaft 40, respectively. The key is rotated between unlocked (FIGURE 5) and locked (FIGURE 8) position by the handle 46.

Referring now to FIGURES 8–11, each of the fastening elements 50 secured to the lower corners of container 2 opposite the locking means 8 comprise a second housing having top, bottom and side walls defining a chamber 52. The bottom wall of housing 50 contains a key slot 54 of a size and configuration to receive the key 44 when the key is in the unlocked (FIGURE 5) position and the container is lowered onto the chassis. The side walls of the second housing 50 contain openings 56 of a size to receive the adjacent end of bolt 22 as shown in FIGURE 8. The upper surface of the bottom wall of housing 50 contains a circular recess 59 coaxial with the key slot and having a diameter at least equal to the maximum length of the key slot. This recess permits rotary movement of key 44 between its locked and unlocked positions. The upper surface of the housing 50 contains lateral recesses 58 that define a T-shaped upwardly-extending projection that may be utilized in securing the housing to a lower corner portion of the container 2. The container 2 may be provided with a suitable recess receiving the fastening element 50 as shown in FIGURE 8, or the element 50 may be welded or bolted to the lower surfaces of containers having planar bottom walls.

In operation, assuming that the pairs of angle irons 4 are appropriately secured on the upper surface of a chassis (as shown in FIGURES 1 and 3) and that corresponding fastening elements 50 are secured adjacent the lower corners of each container, the handles 24 and 46 are pivoted to their unlocked (FIGURE 5) positions and the container is lowered downwardly upon the chassis so that the keys 44 are received in the key slots 54. Each handle 24 is pivoted upwardly to the unlocked (FIGURE 5) position, whereupon the bolt 22 is displaced axially to the left to cause insertion of the end of bolt into the corresponding aperture 56. The handle is then released and falls by gravity to its normally locked position (FIGURES 6–8). Handle 46 is then pivoted to its locked (FIGURE 8) position, whereupon orthogonal portions of each housing 50 are connected with the corresponding angle iron 4.

It is apparent that according to the safety feature afforded by the provision of the pair of plates 28, 30, inadvertent shifting of the bolt to the right is avoided. If, for example, the handle should accidently be operated to permit shifting of the bolt to the right to its intermediate position, release of the handle will effect locking of the bolt in this intermediate position. To fully retract the bolt, the handle 24 must again be pivoted to the FIGURE 5 position to permit further right hand movement of the bolt. Of course, it is obvious that, if desired, the slot in plate 30 might be angularly arranged relative to the slot in plate 28, whereby corresponding manipulation of handle 24 is required to effect shifting of the bolt between its fully extended and retracted positions.

The housing 50 may be formed as a single casting or as a rigid welded assembly of cast sections. The housing 12 may consist of sections that are bolted or permanently welded to each other.

While in accordance with the provisions of the patent statutes the preferred form and embodiment of the invention has been illustrated and described, it will be apparent to those skilled in that art that changes may be made in the apparatus described without deviating from the invention set forth in the following claims.

What is claimed is:

1. A locking system for coupling a shipping container to a transport chassis, comprising at least one pair of parallel spaced opposed angle iron means of generally L-shaped configuration extending transversely of and longitudinally spaced relative to said chassis, said angle iron means including horizontal portions adapted for connection with the chassis frame, and vertical portions extending upwardly from the remote edges of said horizontal portions, respectively;

a plurality of fastening elements adapted for connection in transversely spaced relationship with the lower portion of the container for seating engagement upon the horizontal portion of at least one of said angle iron means, each of said fastening elements comprising a first housing including bottom and side walls at least partially defining a first chamber, the vertical portion of said angle iron means and the housing side walls adjacent thereto containing aligned apertures, the bottom walls of each of said first housings containing key slots;

and a plurality of locking means for locking said fastening elements with the horizontal and vertical portions of said angle iron means, respectively, comprising second housings secured to the opposite side of the vertical portion of said angle iron means from said fastening elements, respectively, each of said second housings including a pair of spaced opposed side walls parallel with said vertical portion, said opposed side walls at least partially defining therebetween a second chamber and containing openings aligned with the associated passage and aperture, a bolt mounted intermediate its ends in said openings for rotational and axial sliding movement relative to said second housing, said bolt being axially shiftable between a locking position in which one end thereof extends through both of said apertures and a retracted position in which the bolt is retracted from the aperture in the first housing, means rotatably biasing said bolt toward a given initial angular position relative to said second housing, means permitting shifting of said bolt between its locking and retracted positions only when the bolt is angularly displaced from said initial position to a predetermined second position, and a key member rotatably connected with the horizontal portion of said angle iron means for rotation about a vertical axis, said key member being adapted for insertion through the slot in said bottom wall of said first housing and rotatable to a locking position relative to the said slot.

2. Apparatus as defined in claim 1, and further including means establishing an intermediate position of said bolt between said locking and retracted positions, and means permitting axial movement of said bolt to said intermediate position only when the bolt is angularly displaced from said initial position.

References Cited by the Examiner
UNITED STATES PATENTS

| | | |
|---|---|---|
| 3,011,749 | 12/1961 | Kozak. |
| 3,111,341 | 11/1963 | Fujioka et al. _____ 296—35 |
| 3,125,965 | 3/1964 | De Penti et al. _____ 296—35 X |
| 3,144,838 | 8/1964 | Shaver et al. _____ 105—366 |

FOREIGN PATENTS 455,330  10/1936  Great Britain.

BENJAMIN HERSH, *Primary Examiner.*

J. A. PEKAR, *Assistant Examiner.*